United States Patent
Tyulenev et al.

(10) Patent No.: US 6,957,211 B1
(45) Date of Patent: Oct. 18, 2005

(54) QUERY OPTIMIZER COST MODEL

(75) Inventors: Mikhail Tyulenev, Belmont, CA (US); Hakan Jakobsson, San Francisco, CA (US); Mohamed Ziauddin, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 547 days.

(21) Appl. No.: 10/139,864

(22) Filed: May 6, 2002

(51) Int. Cl.$^7$ .............................................. G06F 17/30
(52) U.S. Cl. ........................................................ 707/2
(58) Field of Search ...................... 707/1–10, 200–205; 718/104; 713/300

(56) References Cited

U.S. PATENT DOCUMENTS

| | | | | |
|---|---|---|---|---|
| 5,301,317 A | * | 4/1994 | Lohman et al. ................. | 707/2 |
| 5,325,525 A | * | 6/1994 | Shan et al. .................. | 718/104 |
| 6,212,514 B1 | * | 4/2001 | Eberhard et al. ............... | 707/2 |
| 6,470,360 B1 | * | 10/2002 | Vaitheeswaran ............ | 707/205 |
| 2002/0004912 A1 | * | 1/2002 | Fung .......................... | 713/300 |
| 2002/0129003 A1 | * | 9/2002 | Bakalash et al. .............. | 707/1 |
| 2002/0184187 A1 | * | 12/2002 | Bakalash et al. .............. | 707/1 |

OTHER PUBLICATIONS

IBM Corporation *Administration Guide: Performance, Version 7 in IBM® DB2® Universal Database* (2000).

* cited by examiner

*Primary Examiner*—Diane D. Mizrahi
(74) *Attorney, Agent, or Firm*—Bingham McCutchen LLP (57) ABSTRACT

An embodiment of the invention optimizes a DBMS operation based upon multiple criteria, such as input/outputs and CPU time. Multiple optimization criteria are normalized to a common unit of measurement. Normalized optimization criteria are used in a cost function. Estimated execution times are calculated under a variety of different workload environments. Cost values are scaled to a variety of computer architectures.

40 Claims, 7 Drawing Sheets

QUERY OPTIMIZER COST MODEL

BACKGROUND

Field of the Invention

The invention relates to the field of computer systems, and more particularly to methods of optimizing database operations.

Modern database management systems (DBMS) process ever-increasing amounts of data. These database systems can store millions of data records. When accessing large databases, it is important to minimize the amount of time the database access takes, to ensure efficient and speedy operation of the database management system. Most large-scale database management systems use some form of optimization scheme, to ensure that operations executed on the DBMS, such as database queries, are executed as efficiently as possible.

In a database management system, optimization is the process of choosing an efficient way to execute a database query or manipulation action. Examples of such query or manipulation actions include searching, retrieving, modifying, organizing, adding, and/or deleting information from the database. These database query/manipulation actions are normally initiated by submitting commands to a database server in a database query language. One popular database query language is known as the Structured Query Language ("SQL"). For the purposes of explanation only, and not by way of limitation, the following description is made with particular reference to database statements involving SQL.

To execute a database query language statement (e.g., a SQL statement), the database system may have to perform steps involving the retrieval or manipulation of data from various database structures, such as tables and indexes. Often, there exists many alternate ways to execute the SQL statement. For example, a single SQL statement can be executed in different ways by varying the order in which tables and indexes are accessed to execute the statement. The exact combination and order of steps taken to execute the SQL statement can drastically change the efficiency or speed of execution for the statement. The combination and order of steps that are used to execute a SQL statement is referred to as an "execution plan."

As an example, consider the following SQL statement, which queries for the name of all employees having a salary equal to 100 from a database table "emp_table":

SELECT employee_name
FROM emp_table
WHERE salary=100

A first execution plan could include the step of performing a full table scan of emp_table to execute the query. This first execution plan would retrieve every row from emp_table to identify particular rows that match the WHERE clause. Alternatively, if an index exists for the "salary" column of emp_table, then a second execution plan could involve accessing the index to identify rows that match the WHERE clause, and thereafter retrieving only those identified rows from the table. The index is considered an alternate access path to the data sought by the SQL statement.

Each execution plan has a "cost" that is associated with its execution. The cost of an execution plan can be expressed in terms of the resources that are consumed to execute the SQL statement using that execution plan. For example, the cost of an execution plan can be expressed in units of I/O usage, CPU usage, network usage, or memory usage.

An "optimizer" is used by a database system to choose what is believed to be the most efficient execution plan for a SQL statement. A "cost-based" optimizer bases its decision upon the costs of each execution plan. The cost-based optimizer typically generates a set of potential execution plans for the SQL statement based upon available access paths for the data sought to be operated upon by that statement. The cost is then estimated for each execution plan based upon, for example, data distribution and storage characteristics for database structures holding relevant data for the SQL statement. The optimizer then compares relative costs of the execution plans to choose the one with the smallest cost. This is typically done by adding up the total cost for each plan, and choosing the plan with the smallest sum.

Conventional cost-based optimizers can only optimize an operation based on a single cost criterion, for example, number of input/outputs (I/Os) the operation makes on the database. If there are multiple cost criteria, for example number of I/Os and number of central processor unit (CPU) cycles used, a conventional optimizer cannot find the optimal execution plan considering both criteria, since there is no way to compare the costs of each of the multiple criteria to reach a single optimal solution. The I/O cost is expressed as a number of I/O's, and the CPU cost is expressed as a number of CPU cycles. These two numbers cannot be added together, or compared with each other, since they are expressed in different units.

This problem is particularly acute when the relative costs of the multiple criteria change over time, for example when the workloads on the DBMS vary. For example, when the workload on the DBMS is a large number of short, CPU-intensive transactions, as is typical for an on-line transaction processing (OLTP) environment, then the demand on the CPU is high, relative to the demand on the I/O system. Thus, the optimal execution plan for OLTP is one that favors minimizing CPU usage over minimizing I/O usage. However, when the workload is a smaller number of long, I/O-intensive transactions, as is typical for a night-time batch job processing environment (BATCH), then the demand on the CPU is low, relative to the demand on the I/O system. Thus, the optimal execution plan for BATCH processing is one that favors minimizing I/O usage over minimizing CPU usage. Conventional cost-based optimizers will not only be inaccurate under these conditions, but they will be inaccurate in different ways at different times, as the relative costs change. These variable inaccuracies render the optimization decisions made by conventional optimizers even less useful.

Additionally, most conventional optimizers do not handle platform-dependent optimization criteria well. For example, when optimizing an operation based on the number of CPU cycles the operation uses, such an optimization performed by a conventional optimizer is not very accurate, since the same operation run on different computer architectures (i.e. Sun, Intel, IBM, etc.) uses a different number of CPU cycles, and the time a CPU cycle takes to execute also varies from architecture to architecture. An attempt to optimize an operation based on multiple criteria, including platform-dependent criteria, is extremely difficult for a conventional optimizer to handle. Thus, systems and methods are needed to optimize a DBMS operation based upon multiple criteria, including platform-dependent criteria.

SUMMARY OF THE INVENTION

An embodiment of the invention optimizes a DBMS operation based upon multiple criteria, such as input/outputs and CPU time.

In an aspect of an embodiment of the invention, multiple optimization criteria are normalized to a common unit of measurement.

In another aspect of an embodiment of the invention, normalized optimization criteria are used in a cost function.

In another aspect of an embodiment of the invention, estimated execution times are calculated under a variety of different workload environments.

In another aspect of an embodiment of the invention, cost values are scaled to a variety of computer architectures.

DETAILED DESCRIPTION

Figure 1:
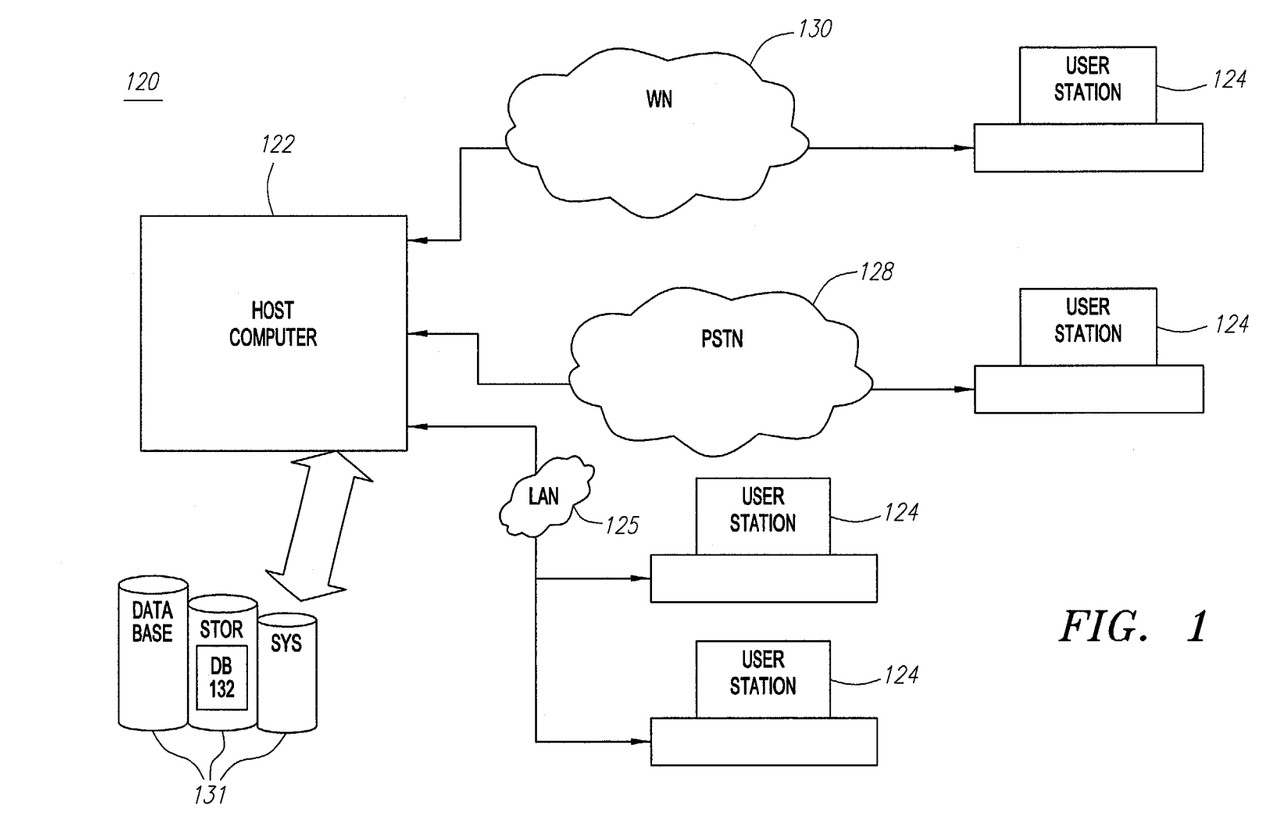
FIG. 1 is a representation of a computer system in accordance with an embodiment of the invention.

Referring to FIG. 1, a computer system 120 constructed in accordance with one preferred embodiment of the present invention includes a host computer 122 connected to a plurality of individual user stations 124. The user stations 124 each comprise suitable data terminals, such as, e.g., personal computers, portable laptop computers, or personal data assistants ("PDAs"), which can store and independently run one or more applications, i.e., programs. For purposes of illustration, some of the user stations 124 are connected to the host computer 122 via a local area network ("LAN") 125. Other user stations 124 are remotely connected to the host computer 122 via a public telephone switched network ("PSTN") 128 and/or a wireless network 130.

The host computer 122 operates in conjunction with a data storage system 131, which contains a database 132 that is readily accessible by the host computer 122. In alternative embodiments, the database 132 may be resident on the host computer, stored, e.g., in the host computer's ROM, PROM, EPROM, or any other memory chip, and/or its hard disk. In yet alternative embodiments, the database 132 may be read by the host computer 122 from one or more floppy disks, flexible disks, magnetic tapes, any other magnetic medium, CD-ROMs, any other optical medium, punchcards, papertape, or any other physical medium with patterns of holes, or any other medium from which a computer can read. In further alternative embodiments, the host computer 122 can access two or more databases 132, stored in a variety of mediums, as previously discussed.

Figure 2:
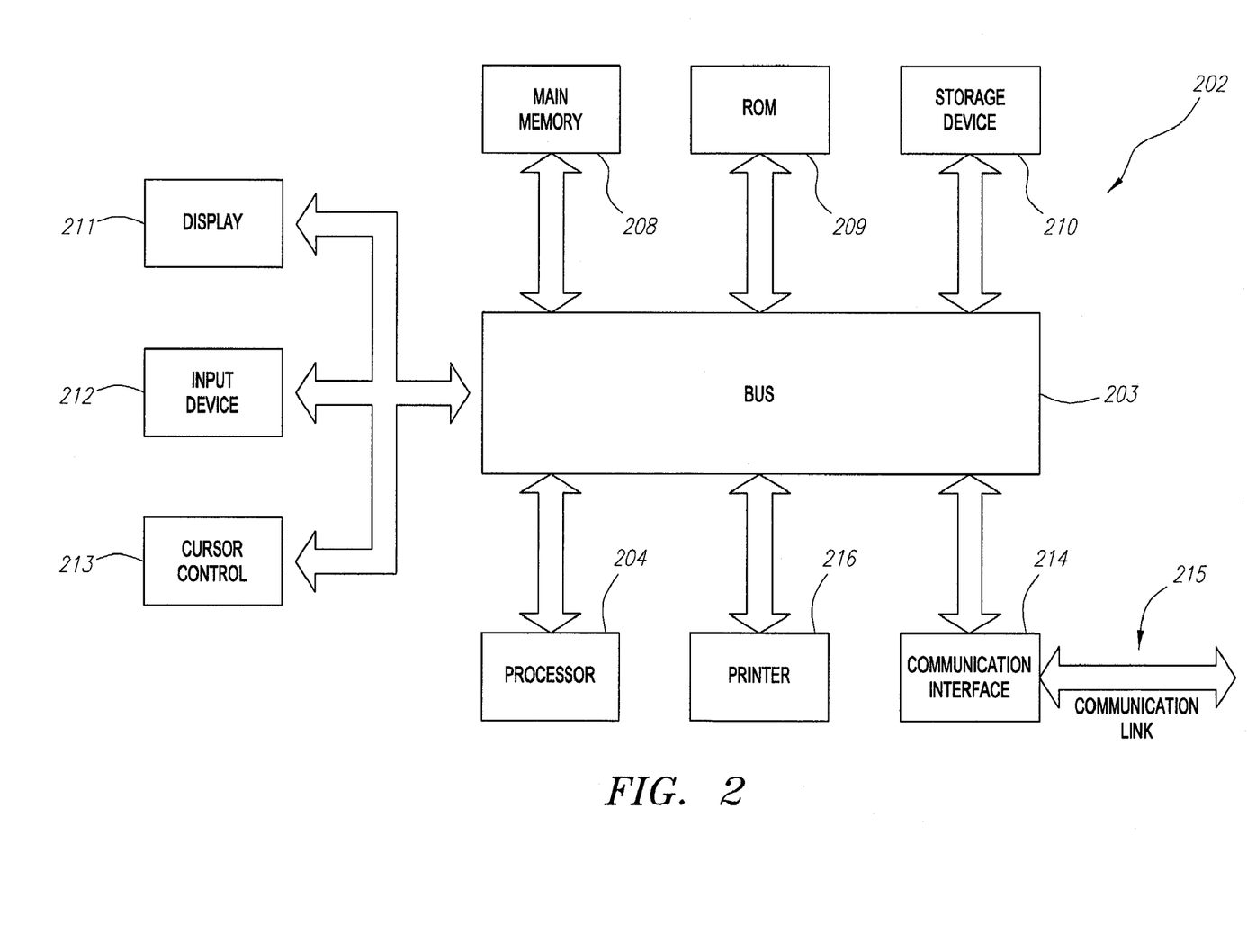
FIG. 2 is a representation of a processing unit used in the computer system of FIG. 1.

Referring to FIG. 2, each user station 124 and the host computer 122 can be referred to generally as a processing unit 202. The processing unit 202 includes a bus 203 or other communication mechanism for communicating instructions, messages and data, collectively, information, and one or more processors 204 coupled with the bus 203 for processing information. The processing unit 202 also includes a main memory 208, such as a random access memory (RAM) or other dynamic storage device, coupled to the bus 203 for storing dynamic data and instructions to be executed by the processor(s) 204. The main memory 208 also may be used for storing temporary data, i.e., variables, or other intermediate information during execution of instructions by the processor(s) 204.

The processing unit 202 further includes a read only memory (ROM) 209 or other static storage device coupled to the bus 203 for storing static data and instructions for the processor(s) 204. A storage device 210, such as a magnetic disk or optical disk, is also provided and coupled to the bus 203 for storing data and instructions for the processor(s) 204. An output device such as a printer 216 is also provided and coupled to the bus 203, for outputting information to the user.

The processing unit 202 is also coupled via the bus 203 to a display device 211, such as, but not limited to, a cathode ray tube (CRT), for displaying information to a user. An input device 212, including alphanumeric and other keys, is coupled to the bus 203 for communicating information and command selections to the processor(s) 204. Another type of user input device may include a cursor control 213, such as, but not limited to, a mouse, a trackball, a fingerpad, or cursor direction keys, for communicating direction information and command selections to the processor(s) 204 and for controlling cursor movement on the display 211.

The individual processing units 202 perform specific operations by their respective processor(s) 204 executing one or more sequences of one or more instructions contained in the main memory 208. Such instructions may be read into the main memory 208 from another computer-usable medium, such as the ROM 209 or the storage device 210. Execution of the sequences of instructions contained in the main memory 208 causes the processor(s) 204 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 204. Such a medium may take many forms, including, but not limited to, non-volatile, volatile and transmission media. Non-volatile media, i.e., media that can retain information in the absence of power, includes the ROM 209. Volatile media, i.e., media that can not retain information in the absence of power, includes the main memory 208. Transmission media includes coaxial cables, copper wire and fiber optics, including the wires that comprise the bus 203. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 204 can retrieve information.

Various forms of computer-usable media may be involved in providing one or more sequences of one or more instructions to the processor(s) 204 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 203 may receive the infrared signals and place the instructions therein on the bus 203. The bus 203 may carry the instructions to the main memory 208, from which the processor(s) 204 thereafter retrieves and executes the instructions. The instructions received by the main memory 208 may optionally be stored on the storage device 210, either before or after their execution by the processor(s) 204.

Each processing unit 202 also includes a communication interface 214 coupled to the bus 203. The communication interface 214 provides two-way communication between the processing units 202 (such as, e.g., between a user station 124 and the host computer 122) via a communication link 215. The communication interface 214 of a respective processing unit 202 transmits and receives electrical, electromagnetic or optical signals that include data streams representing various types of information, including instructions, messages and data.

The communication link 215 may be a LAN 125, in which case the communication interface 214 may be a LAN card. Alternatively, the communication link 215 may be a PSTN 128, in which case the communication interface 214 may be an integrated services digital network (ISDN) card or a modem. In addition, as a further alternative, the communication link 215 may be a wireless network 130.

Each processing unit 202 transmits and receives messages, data, and instructions, including program, i.e., application, code, through its respective communication link 215 and communication interface 214. Received program code may be executed by the respective processor(s) 204 as it is received, and/or stored in the storage device 210, or other associated non-volatile media, for later execution. In this manner, a processing unit may receive messages, data and/or program code in the form of a carrier wave.

The computer system 120 runs a database management system (DBMS). The database management system is responsible for managing access to the database 132 by various entities, These entities include, for example, users of the host computer 122 or the user stations 124, or other computer programs running on the host computer 122 or the user stations 124. The entities access the database 132 by, for example, submitting queries on the data contained in the database 132.

Figure 9:
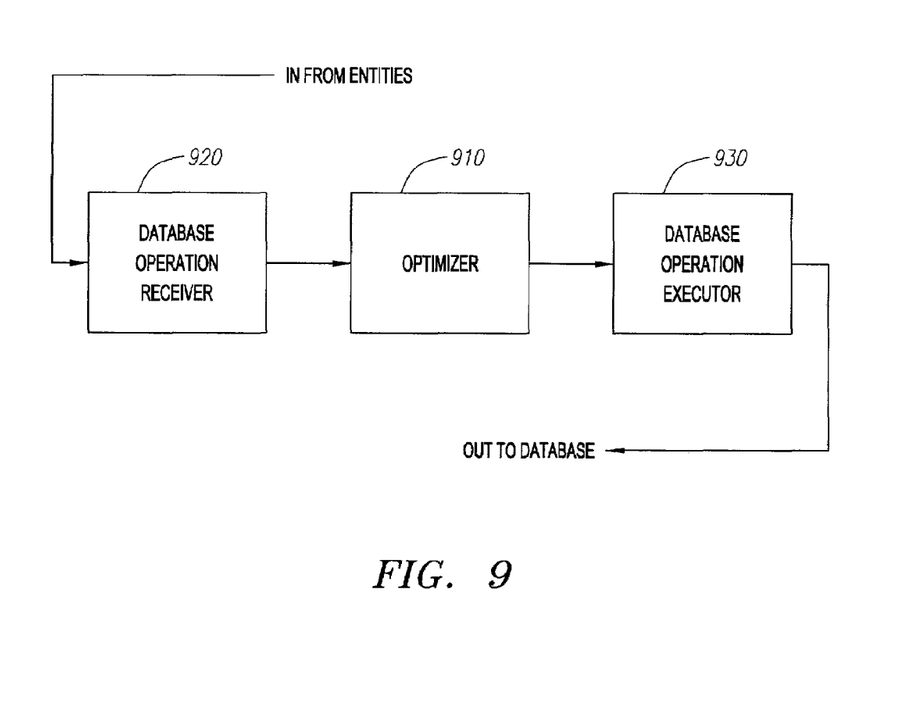
FIG. 9 is a representation of a system for optimizing a database operation.

Turning briefly to FIG. 9, the DBMS includes an optimizer 910, which optimizes the queries prior to their being executed on the database 132. The DBMS further includes a database operation receiver 920 that receives database operations from the entities, and passes the database operations to the optimizer. The DBMS further includes a database operation executor 930 that receives the optimized database operations from the optimizer and executes them on the data stored in the database 132.

Figure 3:
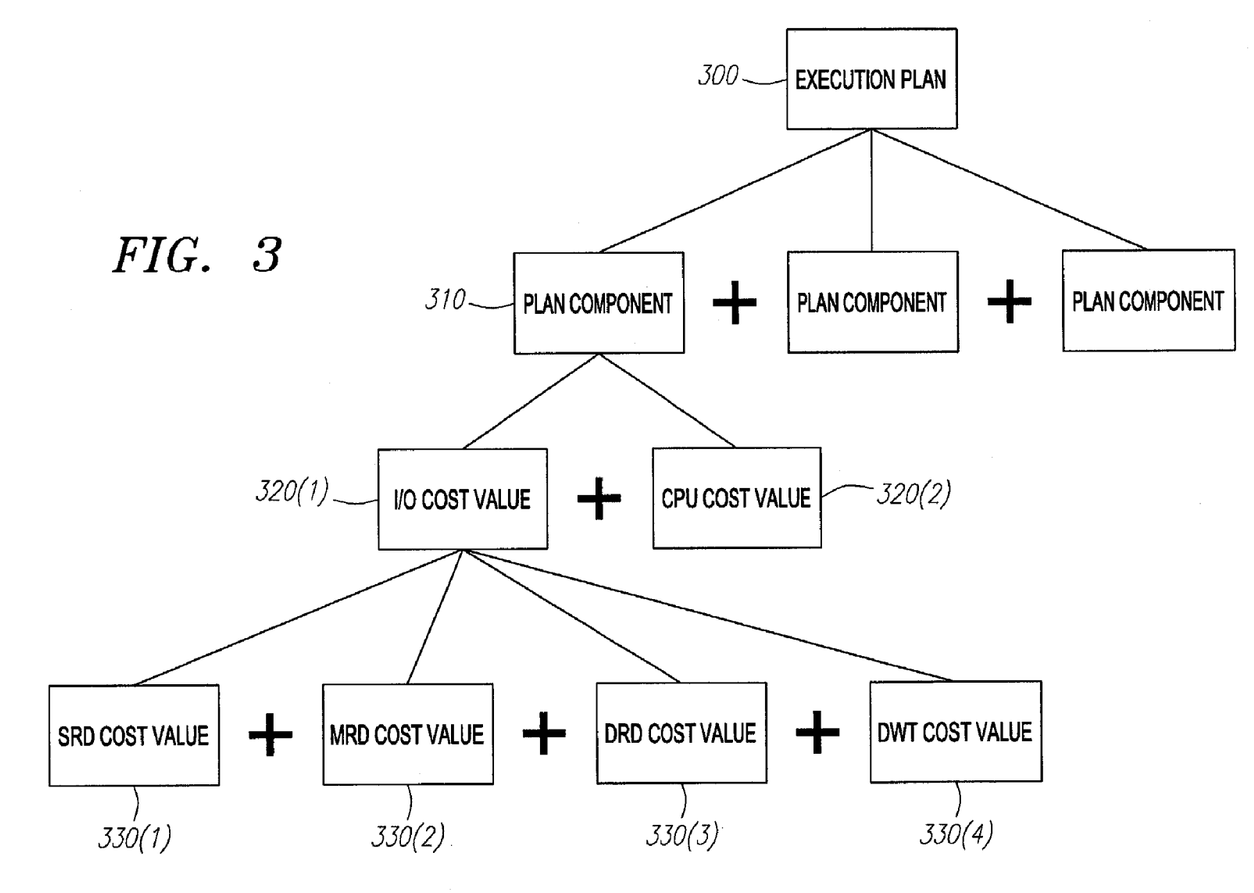
FIG. 3 is a representation of an execution plan used by an optimizer running on the computer system of FIG. 1.

Turning to FIG. 3, these queries are optimized by generating a plurality of execution plans 300, and selecting the execution plan 300 with the lowest cost, as determined by a cost function. The SQL statement shown below is an example of a query that queries for the name of all employees having a salary equal to 100 from a database table "emp_table":

SELECT employee_name
FROM emp_table
WHERE salary=100

In optimizing the SQL statement above, the optimizer generates a first execution plan, which performs a full table scan of emp_table to execute the query. This first execution plan retrieves every row from emp_table to identify particular rows that match the WHERE clause. If an index exists for the "salary" column of emp_table, then the optimizer also generates a second execution plan, which accesses the index to identify rows that match the WHERE clause, and thereafter retrieves only those identified rows from the table.

Figure 4A:
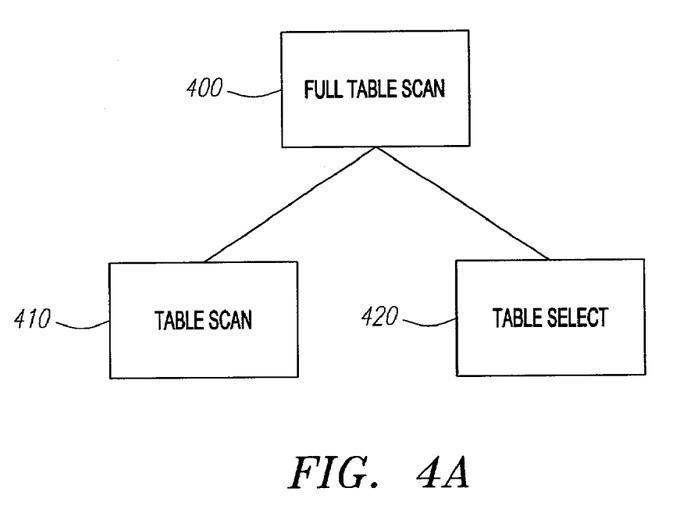
FIG. 4A is a representation of a full table scan execution plan.
Figure 4B:
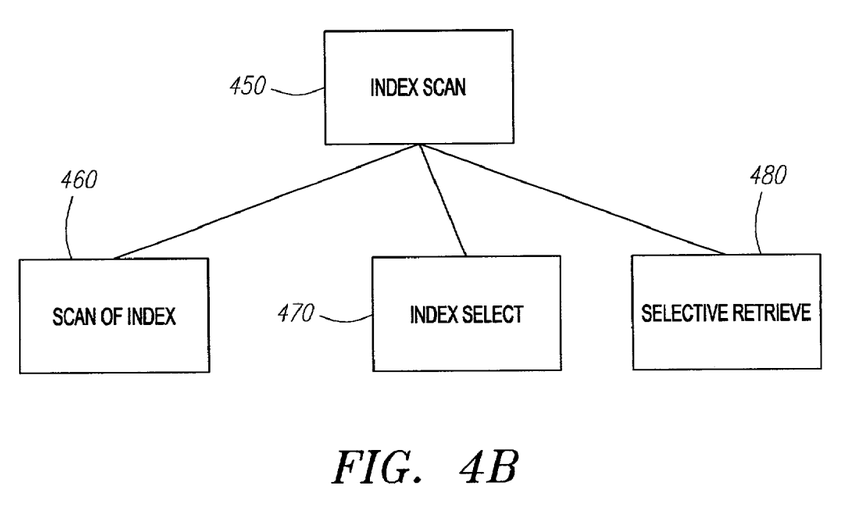
FIG. 4B is a representation of an index scan execution plan.

Each execution plan 300 contains one or more plan components 310. For example, turning to FIGS. 4A–B, the first execution plan 400 includes two plan components 310; a full table scan 410 of emp_table (to retrieve emp_table from the database 132), and a table select 420 (to extract from emp_table the rows that match the WHERE clause). The second execution plan 450 includes three plan components 310, an index scan 460 of the "salary" index (to retrieve the "salary" index from the database 132), an index select 470 (to extract from the salary index the index entries that identify the rows that match the WHERE clause) and a selective retrieve 480 (to retrieve the identified rows from emp_table).

Returning to FIG. 3, each plan component 310 includes several cost values 320 that quantify the various costs incurred in executing the plan component 310, including an I/O cost value 320(1) and a CPU cost value 320(2). The cost values 320 can optionally include other costs, such as caching information, bandwidth usage, network usage, etc.

The total cost of a plan component 310 is expressed as the following cost function:

$$Cost = I/O\ Cost + CPU\ cost$$

The I/O cost value 320(1) can be further broken down into I/O type cost values 330, by the type of I/O performed. This yields the following expression of the cost function for the plan component 310:

$$Cost = SRD\ cost + MRD\ cost + DRD\ cost + DWT\ cost + CPU\ cost$$

Where the cost values 320, 330 of the cost function are defined in Table 1 below.

TABLE 1

| Term | Definition |
|---|---|
| SRD | number of single block reads (a single block read is a synchronous read of one data block from disk into a buffer cache and from the buffer cache to the requesting operation) |
| MRD | number of multi block reads (a multi-block read is a synchronous read of one or more consequent data blocks from disk into a buffer cache and from the buffer cache to the requesting operation) |

TABLE 1-continued

| Term | Definition |
| --- | --- |
| DRD | number of direct reads (a direct read is a synchronous or asynchronous read of one or more consequent data blocks from disk directly into the requesting operation) |
| DWT | number of direct writes (a direct write is a synchronous or asynchronous write of one or more consequent data blocks to disk) |
| CPU | number of CPU cycles (query processing and data retrieval) |

Each cost value 320, 330 of the cost function is normalized to a common unit of measurement, so that the total cost of the plan component 310 is easily generated by adding the normalized costs of each of the cost values 320, 330 together. For example, SRD is expressed in units of "single block reads". This value is multiplied by the time it takes to do a single block read (t_SRD), expressed in units of "time/single block read". Since the "single block reads" units cancel each other out, this converts the SRD cost into time units.

$$\text{SRD(single block reads)} * \text{time} \frac{(\sec)}{(\text{single block reads})}$$

Applying this normalization to each cost value 320, 330 of the cost function for the plan component 310 yields the following expression of the cost function for the plan component 310:

Cost=SRD*t_SRD+
MRD*t_MRD+
DRD*t_DRD+
DWT*t_DWT+
CPU*t_CPU+

Where the normalized units are defined in Table 2 below.

TABLE 2

| Units | Definition |
| --- | --- |
| t_SRD | time to do a single block read |
| t_MRD | time to do a multi-block read |
| t_DRD | time to do a direct read |
| t_DWT | time to do a direct write |
| t_CPU | time to do a CPU cycle |

Figures 5, 6:
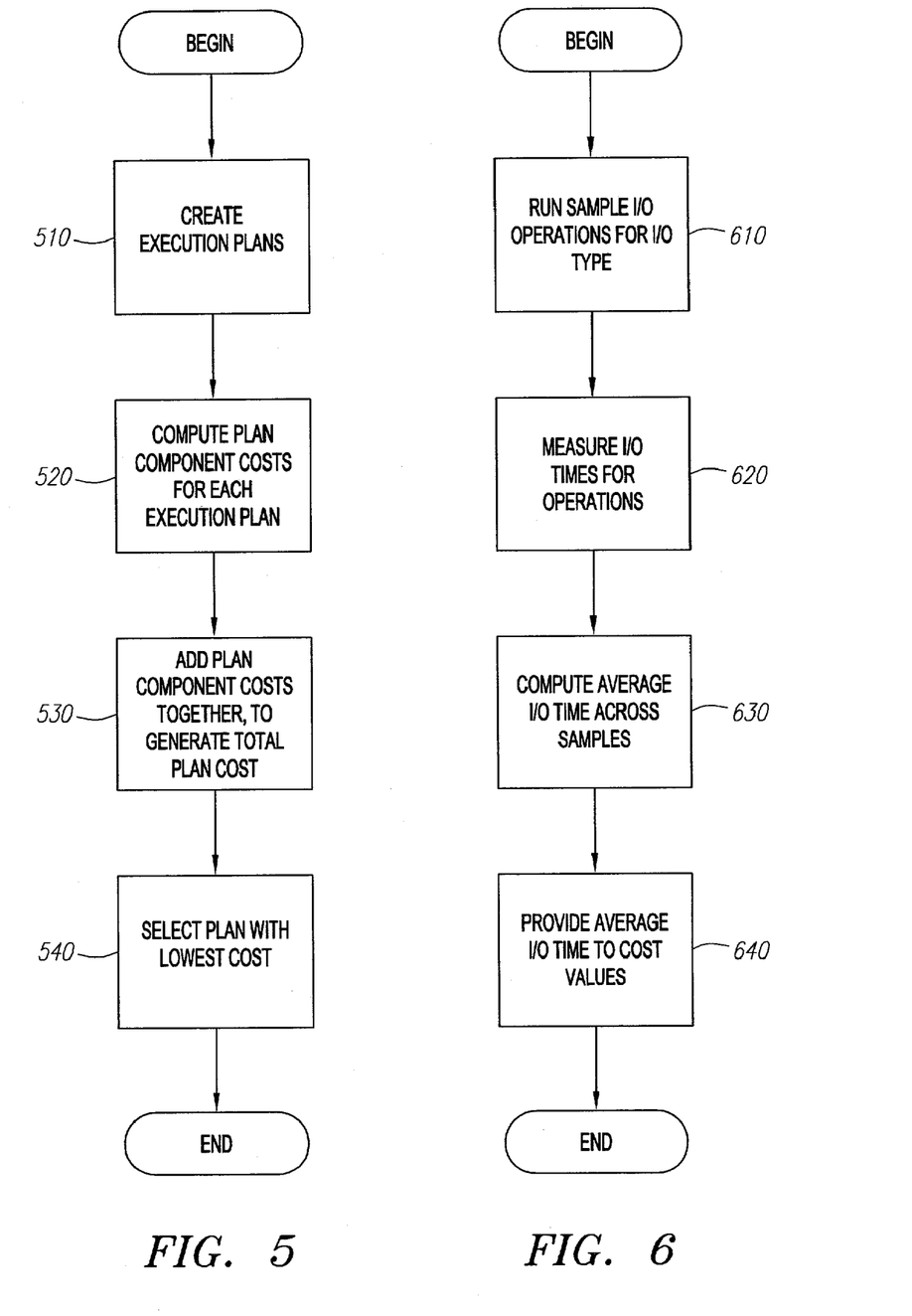
FIG. 5 is a flowchart of a method for computing an optimal execution plan.
FIG. 6 is a flowchart of a method for generating an estimated I/O time.

With reference to FIG. 5, the optimizer uses the normalized cost function to compute an optimal execution plan 300 for the query being optimized. At step 510, the optimizer analyzes the query and formulates a set of execution plans 300, each execution plan 300 having one or more plan components 310. At step 520, the optimizer examines the plan components 310 of each execution plan 300 and computes the normalized cost function value for each plan component 310, by estimating each cost value 320, 330 of the normalized cost function associated with each plan component 310 and adding the cost values 320, 330 together. At step 530, the optimizer adds up the total of the normalized cost function values for each plan component 310, to derive a total normalized cost of each execution plan 300. At step 540, the optimizer examines the total normalized costs for each execution plan 300, and selects the lowest total normalized cost execution plan 300 for execution on the database 132.

The various estimates made above will now be discussed in more detail. To generate the estimated cost values 330 for each type of I/O for each plan component 310, each plan component 310 is examined, and a cost function is generated that gives the number of I/O's as a function of the size of the target of the I/O (e.g. size of the table or index being read) and the way that the plan component 310 is implemented in the DBMS. For example, a full table scan plan component does a multi-block read (MRD) to load data from a table. Thus, the MRD cost value 330(2) of the cost function for the full table scan is equal to the number of blocks in the table, perhaps modified by a value expressing the number of blocks that can be read from the I/O system in a single I/O operation (MBRC). The cost values 330(1), 330(3), 330(4) for the other I/O types are zero, yielding the following cost function:

$$\frac{(\text{table blocks})}{MBRC} * \text{t\_MRD} + 0 * \text{t\_DRD} + 0 * \text{t\_DWT} + CPU * \text{t\_CPU}$$

The value CPU above represents the total number of CPU cycles required to do the multiblock read. For the multi-block read example, this value is derived according to the following formula:

CPU=(number of blocks to read from disk)*((cycles to read one block from disk into buffer cache)+(cycles to read block from buffer cache))+(number of blocks to read from buffer cache)*(cycles to read block from buffer cache)+(number of rows to process)*((cycles to get row)+(cycles to get columns)+(cycles to process predicates))

This CPU value is then multiplied by the time it takes to do a CPU cycle.

The above example is for serial execution of a full table scan plan component. For parallel execution, the above example is modified in several ways. First, in parallel execution the buffer cache is bypassed, so the CPU cost value is expressed as follows:

CPU=(number of blocks to read from disk)*(cycles to read one block from disk)+(number of rows to process)*((cycles to get row)+(cycles to get columns)+(cycles to process predicates))

With this modification, the cost function described above is used to generate a preliminary cost estimate for the full table scan. This preliminary cost estimate is then divided by the degree of parallelism specified for the table, to yield a cost for parallel execution of the full table scan:

$$\text{Cost(parallel)} = \frac{\text{Cost(serial)}}{\text{degree of parallelism}}$$

The degree of parallelism is a value typically specified by a user of the database, a creator of the table, etc. This value specifies the number of parallel processes that should be used to operate on the table. For example, if the degree of parallelism is three (3), then three parallel processes should be used to operate on the table.

This parallel cost value can then be tuned to produce more accurate estimates. For example, I/O systems have a maximum throughput value, expressed as megabytes of data per second. This is the fastest rate at which data can be read from the I/O system. This imposes a first lower limit on the parallel cost of a plan component. Regardless of the number of parallel processes operating on the table, data cannot be read from the table faster than the I/O system can supply the data. This first lower limit is expressed as:

$$\text{Minimum table scan cost (1)} = \frac{\text{size of table (Mb)}}{\text{maximum throughput (Mb/Sec)}}$$

Additionally, there may be an external limit on the number of parallel processes themselves, or on the throughput of these parallel processes. For example, where the user has specified that 10 parallel processes be used (degree of parallelism=10), but only 5 parallel processes are available, then this external limit will impact the cost estimate. Similarly, the parallel processes This yields a second lower limit on the parallel cost of a plan component, expressed as follows:

$$\text{Minimum table scan cost (2)} = \frac{\text{size of table (Mb)}}{\text{average throughput of process} * \text{number of processes.}}$$

The tuned parallel cost value is then expressed as:
Maximum(Cost(parallel), Minimum table scan cost (1), Minimum table scan cost (2))
which is the highest time value of the three values computed above. The parallel cost value is thus limited by the throughput of the I/O system and the throughput of the parallel processes. These throughput values are computed by the DBMS, and can be re-calculated as the workloads on the system change.

To generate the cost function, the times to perform the various I/O operations for the I/O types are estimated. With reference to FIG. 6, to generate the estimated time an I/O operation for an I/O type consumes, the DBMS executes sample I/O operations for the I/O type on the database 132 (step 610), and measures the time consumed by the I/O operations (step 620). The DBMS computes the average time consumed by the I/O operations for the I/O type (step 630), and makes this average time value available for use in the cost value 330 for the I/O type (step 640). The average time value can optionally include a component that expresses the impact of caching on the time value. Since there is no I/O cost to read data from a cache, the average I/O time value can be reduced by the estimated cache ratio for the table or other object being accessed. Other system statistics, such as the maximum throughput of the I/O system or the average throughput of a parallel process, are also estimated using similar methods.

For example, to determine the estimated time a single block read operation takes (t_SRD), a series of SRD operations are performed on the database 132, the operation time of each SRD operation is measured, and the average time the series of SRD operations took to execute is computed. This average time is made available to the cost value 330(1), as t_SRD. Times for the other cost values 330 are computed similarly. These average time values can be either static values, gathered once and used thereafter in the cost functions, or dynamic values, gathered repeatedly as the database 132 processes queries.

To improve the accuracy of the estimates, the average time values discussed above can be measured under a variety of workloads, such as OLTP or BATCH. Thus, each cost value 330 has associated with it several time estimates, e.g., one for each workload that the database 132 operates under, or one for each workload configured by the user. For example, t_SRD will have one value for the OLTP workload (t_SRD(OLTP)), and a different value for the BATCH workload (t_SRD(BATCH)). Similarly, t_MRD, t_DRD, t_DWT and t_CPU have workload-specific values. Other system statistics, such as caching ratios, maximum I/O system throughput, or average parallel process throughput, can also be measured separately for each workload.

When the cost value 330 is computed by the optimizer, the average time for the I/O type, under the appropriate workload, is made available to the cost value 330. For example, where the query being optimized is executed under an OLTP workload, the cost values 330 for the plan components 310 of the execution plans 300 for the query are supplied with time estimates under the OLTP workload for the I/O type. Similarly, the throughput values are supplied with time estimates under the OLTP workload. Thus, the query optimization function is tuned based on the workload specified by the user of the query. The workload can optionally be a workload the database 132 is operating under, or a workload selected by the DBMS based on a heuristic algorithm, rather than the workload specified by the user of the query. The cost function including the workload is thus expressed as follows:

Cost(workload)=SRD*t_SRD(workload)+
MRD*t_MRD(workload)+
DRD*t_DRD(workload)+
DWT*t_DWT(workload)+
CPU*t_CPU(workload)

Figure 7:
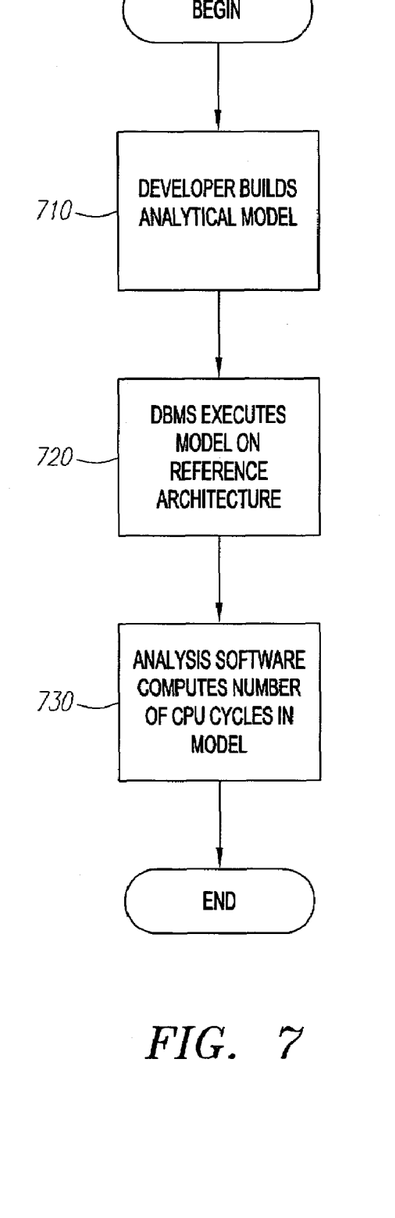
FIG. 7 is a flowchart of a method for calculating the number of CPU cycles in a plan component.

To compute the CPU cost value 320(2), the number of CPU cycles in the plan component 310 and the time to execute a CPU cycle are calculated. Turning to FIG. 7, to calculate the estimated number of CPU cycles (CPU) a plan component 310 (e.g. full table scan, index scan, table select, index select, sort, etc) uses, a developer builds an analytical model for the plan component 310 (step 710). The developer executes the analytical model on a reference architecture (R) (e.g. a Sun SPARC running Solaris 2.6 operating system) (step 720), and analysis software computes the number of CPU cycles in the analytical model, as a function of the size of the target of the plan component 310 (step 730). This method yields the number of cycles the plan component 310 uses on the reference architecture (R).

Figure 8:
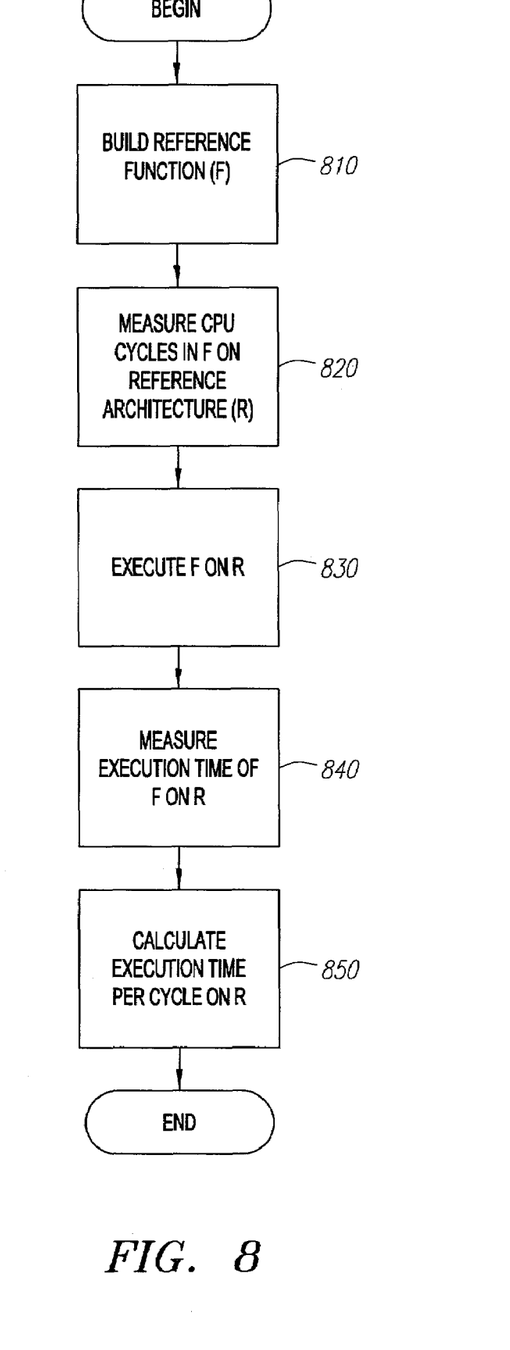
FIG. 8 is a flowchart of a method for calculating the execution time of a CPU cycle.

Turning to FIG. 8, to calculate the estimated time a CPU cycle takes to execute (t_CPU) on the reference architecture R, the developer creates a reference function (F) (step 810) and the number of CPU cycles in F is computed as discussed above (step 820). The developer then executes the reference function F on the reference architecture R (step 830) and the developer times the execution time of the reference function F (step 840). The execution time is divided by the number of CPU cycles in F (step 850), yielding the time a CPU cycle takes to execute (t_CPU) on the reference architecture R:

$$t\_CPU(R) = \text{time\_to\_run}\_F\_\text{on}\_R / CPU(R)\_\text{in}\_F$$

To improve the accuracy of t_CPU, the reference function F can be run under various workloads, and various workload-specific CPU cycle times can be computed, as discussed above for I/O times. For example, there is one value of t_CPU for the OLTP workload, and a second value of t_CPU for the BATCH workload. If we assume that there will be fewer processes running in a BATCH workload than an OLTP workload, then t_CPU will be lower for the BATCH workload, since the operating system will perform fewer context switches between processes.

The above estimates for CPU cycles (CPU) and CPU cycle time (t_CPU) are specific to the reference architecture R. The same plan component 310, when executed on a different target architecture (T), may use a different number of CPU cycles. Furthermore, the time a CPU cycle takes to execute may vary from one target architecture to another. To improve the accuracy of the estimates when the optimizer is running on a different target architecture T, all of the above calculations can be performed again on the target architecture T. Alternatively, the CPU cost value 320(2) for plan components 310 for the target architecture can be derived from the calculations already made for the reference platform R.

Recall that the general formula for the CPU cost value 320(2) of the cost function for a plan component 310 is:

$$CPU\ cost = CPUcycles * t\_CPU \qquad 1$$

where CPUcycles is the number of cycles in the plan component 310 and t_CPU is the cycle execution time.

Therefore, the version of formula 1 specific to a plan component 310 on the target architecture T is:

$$CPU\ cost(T) = CPUcycles(T) * t\_CPU(T) \qquad 2$$

where CPUcycles(T) is the number of cycles in the plan component 310 on T, and t_CPU(T) is the cycle execution time on T.

The number of CPU cycles in the plan component 310 on architecture T is derived by multiplying the known number of CPU cycles in the plan component 310 on the reference architecture R by a conversion factor, as follows:

$$CPUcycles(T) = CPUcycles(R) * cycles\_R\_to\_T \qquad 3$$

where cycles R to T is a conversion factor that converts the number of cycles in the component on R to a number of cycles on T. Note that this conversion factor need not be actually computed. As will become clear below, the conversion factor will be cancelled out of the final formula.

Thus, substituting the value for CPUcycles(T), derived in formula 3, into formula 2, yields the following:

$$CPU\ cost(T) = CPUcycles(R) * cycles\_R\_to\_T * t\_CPU(T). \qquad 4$$

As discussed above for the reference architecture R, t_CPU(T) is calculated as follows:

$$t\_CPU(T) = time\_to\_run\_F\_on\_T / CPUcycles(T)\_in\_F. \qquad 5$$

Substituting the version of formula 3 for F into formula 5 yields the following:

$$t\_CPU(T) = time\_to\_run\_F\_on\_T / (CPUcycles(R)\_in\_F * cycles\_R\_to\_T). \qquad 6$$

Substituting the value for t_CPU(T), derived in formula 6, into formula 4 yields the following:

$$CPU\ cost(T) = \frac{CPUcycles(R) * cycles\_R\_to\_T * time\_to\_run\_F\_on\_T}{CPUcycles(R)\_in\_F * cycles\_R\_to\_T} \qquad 7$$

Since:

$$\frac{cycles\_R\_to\_T}{cycles\_R\_to\_T} = 1 \qquad 8$$

the conversion factors cancel each other out of formula 7, yielding the following:

$$CPU\ cost(T) = \frac{CPUcycles(R) * time\_to\_run\_F\_on\_T}{CPUcycles(R)\_in\_F} \qquad 9$$

Thus, the CPU cost of a plan component 310 on a target architecture T is dependent on the known values for the number, of CPU cycles on the reference architecture R in the plan component 310 and the reference function F, and on the execution time of the reference function F, as executed on the target architecture T. Therefore, to determine the CPU cost of a plan component 310 on the target architecture T, the execution time of the reference function F (time_to_run_F_on_T) is re-calculated on the target architecture T. As discussed above, the reference function F can be executed under various workloads, as desired. The other values are all dependent on the reference architecture R, and are computed once.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents.

We claim:

1. A computer implemented optimizer cost function to estimate an execution cost of an execution plan, comprising:
    a first set of cost values configured to estimate a plan's first consumption amount of a first resource, at a plurality of database workloads; and
    a second set of cost values configured to estimate a plan's second consumption amount of a second resource, at the plurality of database workloads,
    wherein the first cost value set and the second cost value set comprise cost values normalized to a common unit of measurement.

2. The optimizer cost function of claim 1, wherein the first resource comprises a plurality of input/outputs (I/Os).

3. The optimizer cost function of claim 2, wherein the plurality of I/Os includes one or more from the group of single block reads, multi-block reads, direct reads, direct writes, and CPU cycles.

4. The optimizer cost function of claim 1, wherein the second resource comprises CPU cycles.

5. The optimizer cost function of claim 1, wherein the common unit of measurement comprises execution time.

6. The optimizer cost function of claim 1, wherein the database workloads comprise workloads in which the demand on the CPU is greater than the demand on the I/O.

7. The optimizer cost function of claim 1, wherein the database workloads comprise workloads in which the demand on the CPU is less than the demand on the I/O.

8. The optimizer cost function of claim 1, wherein the first cost value set or the second cost value set is tuned at one or more of the plurality of workloads.

9. The optimizer cost function of claim 1, in which the first cost value and the second cost value for each of the plurality of workloads are combined to generate a set of workload-based execution plan costs.

10. A computer implemented method of estimating an execution cost of an execution plan, comprising:
   computing a first cost value of a first consumption amount of a first resource, the first resource including one or more of a plurality of input/output (I/O) types;
   computing a second cost value of a second consumption amount of a second resource, the second resource comprising CPU cycles;
   normalizing the first cost value and the second cost value to a common unit of measurement; and
   combining the first cost value and the second cost value to generate the execution cost.

11. The method of claim 10, wherein the common unit of measurement comprises execution time.

12. The method of claim 10, wherein the plurality of I/O types includes single block reads, multi-block reads, direct reads, direct writes, and CPU cycles.

13. The method of claim 10, wherein the first cost value of the execution plan is computed at a plurality of database workloads.

14. The method of claim 10, wherein the second cost value of the execution plan is computed at a plurality of database workloads.

15. The method of claim 10, further comprising tuning the first cost value or the second cost values based on a plurality of database workloads.

16. The method of claim 15, wherein the plurality of database workloads comprise batch processing and transaction processing.

17. A computer-useable medium, the medium comprising a sequence of instructions which, when executed by a processor, causes the processor to execute a computer implemented method of estimating an execution cost of an execution plan, comprising:
   computing a first cost value of a first consumption amount of a first resource, the first resource including one or more of a plurality of input/output (I/O) types;
   computing a second cost value of a second consumption amount of a second resource, the second resource comprising CPU cycles;
   normalizing the first cost value and the second cost value to a common unit of measurement; and
   combining the first cost value and the second cost value to generate the estimated execution cost.

18. The computer-useable medium of claim 17, wherein the common unit of measurement comprises execution time.

19. The computer-useable medium of claim 17, wherein the plurality of I/O types includes single block reads, multi-block reds, direct reads, direct writes, and CPU cycles.

20. The computer-useable medium of claim 17, wherein the first cost value of the execution plan is computed and a plurality of database workloads.

21. The computer-useable medium of claim 17, wherein the second cost value of the execution plan is computed at a plurality of database workloads.

22. The computer-useable medium of claim 17, further comprising tuning the first cost value or the second cost value based on a plurality of database workloads.

23. The computer-useable medium of claim 22, wherein the plurality of database workloads comprises batch processing and transaction processing.

24. A computer implemented optimizer cost function to estimate an execution cost of an execution plan, comprising:
   a cost value to estimate a plan's consumption amount of a resource;
   wherein the cost value is tuned at a plurality of database workloads.

25. The optimizer cost function of claim 24, wherein the workload comprises a user-selected workload.

26. The optimizer cost function of claim 24, wherein the workload comprises a workload selected by application of a heuristic.

27. A computer implemented method for estimating execution cost of an execution plan, comprising:
   estimating a first set of cost values for the execution plan, the first set of cost values including a first consumption amount of a first resource at a plurality of database workloads; and
   estimating a second set of cost values for the execution plan, the second set of cost values including a second consumption amount of a second resource at the plurality of database workloads,
   wherein the first cost value set and the second cost value set comprise cost values normalized to a common unit of measurement.

28. The method of claim 27, wherein the first resource comprises a plurality of input/outputs (I/Os).

29. The method of claim 27, further comprising:
   combining the first cost value and the second cost value for each of the plurality of workloads to generate a set of workload-based execution plan costs.

30. A computer program product embodied on computer readable medium, the computer readable medium having stored thereon a sequence of instructions which, when executed by a processor, causes the processor to execute a computer implemented method for estimating execution cost of an execution plan, the method comprising:
   estimating a first set of cost values for the execution plan, the first set of cost values including a first consumption amount of a first resource at a plurality of database workloads; and
   estimating a second set of cost values for the execution plan, the second set of cost values including a second consumption amount of a second resource at the plurality of database workloads,
   wherein the first cost value set and the second cost value set comprise cost values normalized to a common unit of measurement.

31. The computer program product of claim 30, wherein the first resource comprises a plurality of input/outputs (I/Os).

32. The computer program of claim 31, further comprising:
   combining the first cost value and the second cost value for each of the plurality of workloads to generate a set of workload-based execution plan costs.

33. A computer implemented system of estimating an execution cost of an execution plan, comprising:
   means for computing a first cost value of a first consumption amount of a first resource, the first resource including one or more of a plurality of input/output (I/O) types;
   means for computing a second cost value of a second consumption amount of a second resource, the second resource comprising CPU cycles;
   means for normalizing the first cost value and the second cost value to a common unit of measurement; and
   means for combining the first cost value and the second cost value to generate the execution cost.

34. The system of claim 33, further comprising:
   means for tuning the first cost value or the second cost value based on a plurality of database workloads.

35. A computer implemented method to estimate an execution cost of an execution plan, comprising:

estimating a cost value of the execution plan's consumption amount of a resource;

wherein the cost value is tuned at a plurality of database workloads.

36. The method of claim 35, wherein the workload comprises a user-selected workload.

37. The method of claim 35, wherein the workload comprises a workload selected by application of a heuristic.

38. A computer program product embodied on computer readable medium, the computer readable medium having stored thereon a sequence of instructions which, when executed by a processor, causes the processor to execute a computer implemented method to estimate an execution cost of an execution plan, the method comprising:

estimating a cost value of the execution plan's consumption amount of a resource;

wherein the cost value is tuned at a plurality of database workloads.

39. The method of claim 38, wherein the workload comprises a user-selected workload.

40. The method of claim 38, wherein the workload comprises a workload selected by application of a heuristic.

\* \* \* \* \*